United States Patent
Ren et al.

(10) Patent No.: US 12,117,105 B2
(45) Date of Patent: Oct. 15, 2024

(54) PIPE CLAMP AND PIPE CLAMP ASSEMBLY CAPABLE OF REALIZING QUICK CONNECTION

(71) Applicant: JINAN MEIDE CASTING CO., LTD., Jinan (CN)

(72) Inventors: Yanqing Ren, Jinan (CN); Bo Li, Jinan (CN); Ju Zhang, Jinan (CN); Xuan Qian, Jinan (CN); Bo Liu, Jinan (CN)

(73) Assignee: JINAN MEIDE CASTING CO., LTD., Jinan (CN)

( * ) Notice: Subject to any disclaimer, the term of this patent is extended or adjusted under 35 U.S.C. 154(b) by 219 days.

(21) Appl. No.: 17/613,789

(22) PCT Filed: Mar. 25, 2020

(86) PCT No.: PCT/CN2020/081077
§ 371 (c)(1),
(2) Date: Nov. 23, 2021

(87) PCT Pub. No.: WO2021/168956
PCT Pub. Date: Sep. 2, 2021

(65) Prior Publication Data
US 2022/0228684 A1 Jul. 21, 2022

(30) Foreign Application Priority Data
Feb. 27, 2020 (CN) .......................... 202010122895.1

(51) Int. Cl.
*F16L 23/08* (2006.01)
*F16L 21/06* (2006.01)
*F16L 23/18* (2006.01)

(52) U.S. Cl.
CPC ............. *F16L 23/08* (2013.01); *F16L 21/065* (2013.01); *F16L 23/18* (2013.01)

(58) Field of Classification Search
CPC . F16L 23/08; F16L 23/18; F16L 23/04; F16L 21/06; F16L 21/065
(Continued)

(56) References Cited

U.S. PATENT DOCUMENTS 3,790,194 A * 2/1974 Kimberley ............ F16L 21/005
6,267,417 B1 * 7/2001 Fan ............................... 285/420
(Continued)

FOREIGN PATENT DOCUMENTS

CN 208185618 U 12/2018
CN 208719613 U 4/2019
(Continued)

OTHER PUBLICATIONS

WO-2020119655-A1—Machine Translation—English (Year: 2020).*
(Continued)

*Primary Examiner* — William S. Choi
(74) *Attorney, Agent, or Firm* — HAUPTMAN HAM, LLP

(57) ABSTRACT

A pipe clamp and a pipe clamp assembly capable of realizing quick connection. The pipe clamp includes a first coupling section and a second coupling section. The first coupling section and the second coupling section are for fixing pipe fittings together end-to-end. One end of the first coupling section is connected to one end of the second coupling section by a first connecting mechanism, and the other end of the first coupling section is connected to the other end of the second coupling section by a second connecting mechanism. Positioning protrusions are respectively arranged on the inner walls of the first coupling section and the second coupling section. The pipe clamp assembly includes a sealing member. Positioning grooves, matching the positioning protrusions, are in the sealing member. The positioning protrusions for positioning the pipe fittings are on the inner (Continued)

walls of the first coupling section and the second coupling section.

7 Claims, 18 Drawing Sheets

(58) Field of Classification Search
USPC .................................................. 285/367, 420
See application file for complete search history.

(56) References Cited

U.S. PATENT DOCUMENTS

| | | | |
|---|---|---|---|
| 6,364,372 B1 | 4/2002 | Marandi | |
| 6,367,849 B1 | 4/2002 | Tatsuta et al. | |
| 7,722,092 B2 * | 5/2010 | Kim | F16L 23/08 |
| | | | 285/420 |
| 8,439,408 B2 * | 5/2013 | Glocer | 285/367 |
| 2007/0063514 A1 * | 3/2007 | Noda | F16L 21/065 |
| | | | 285/420 |
| 2012/0098259 A1 * | 4/2012 | Sarkisian | F16L 21/065 |
| 2012/0256415 A1 * | 10/2012 | Dole | F16L 21/065 |
| | | | 285/420 |
| 2018/0156367 A1 * | 6/2018 | Piontek | F16L 21/06 |
| 2018/0163906 A1 | 6/2018 | Ohnemus et al. | |

FOREIGN PATENT DOCUMENTS

| | | | | |
|---|---|---|---|---|
| CN | 208967275 U | 6/2019 | | |
| CN | 110249168 A | 9/2019 | | |
| CN | 209354809 U | 9/2019 | | |
| KR | 20090010479 A | 1/2009 | | |
| WO | WO-2020119655 A1 * | 6/2020 | ............ | F16L 21/065 |

OTHER PUBLICATIONS

International Search Report in corresponding International Application No. PCT/CN2020/081077; mailed Nov. 19. 2020, 8 pgs.
Written Opinion in corresponding International Application No. PCT/CN2020/081077; mailed Nov. 19, 2020, 6 pgs.

* cited by examiner

PIPE CLAMP AND PIPE CLAMP ASSEMBLY CAPABLE OF REALIZING QUICK CONNECTION

RELATED APPLICATIONS

The present application is a U.S. National Phase of International Application Number PCT/CN2020/081077 filed Mar. 25, 2020 and claims priority to Chinese Application Number 202010122895.1 filed Feb. 27, 2020.

FIELD OF THE INVENTION

The invention relates to the technical field of pipe connection, in particular to a pipe clamp and a pipe clamp assembly which can realize quick connection.

DESCRIPTION OF THE RELATED ART

The pipe clamp is used for the connection among pipelines. The pipe clamp generally includes two semi-circular ring-shaped structural members, which are connected with each other through connectors. For the pipe clamp that uses the internal sealing members of the pipe clamp for quick installation, the current main technology is to use the middle tongues of the sealing members to limit the position to ensure that the sealing member is installed at the appropriate position during installation, and then the pipelines are installed. While increasing the middle tongue design will certainly increase the rubber material and cause the waste of rubber material.

BRIEF SUMMARY OF THE INVENTION

In order to solve the problem caused by the tongue positioning of a sealing ring in the prior art, the invention provides a pipe clamp and a pipe clamp assembly which can realize quick connection.

A pipe clamp capable of realizing quick connection includes a first coupling section and a second coupling section, which are used to fix the pipe fittings or pipes end-to-end;

one end of the first coupling section and one end of the second coupling section are connected through a first connecting mechanism, and the other end of the first coupling section and the other end of the second coupling section are connected through a second connecting mechanism;

the inner walls of the first coupling section and the second coupling section are respectively provided with positioning protrusions.

Further, the positioning protrusions arranged on the first coupling section are symmetrically distributed with the positioning protrusions arranged on the second coupling section.

Further, the first coupling section is provided with a first positioning protrusion, and the second coupling section is provided with a second positioning protrusion.

Further, the first positioning protrusion is integrally formed with the first coupling section, and the second positioning protrusion is integrally formed with the second coupling section.

Further, the first positioning protrusion is arranged at the geometric center of the inner wall of the first coupling section;

the second positioning protrusion is arranged at the geometric center of the inner wall of the second coupling section.

Further, the inner walls of the first coupling section and the second coupling section are both arc-shaped; the shapes of the first positioning protrusion and the second positioning protrusion are both arc-shaped.

Further, the arc length of the first positioning protrusion is ⅓ to ⅔ of the arc length of the inner wall of the first coupling section.

Further, the arc length of the second positioning protrusion is ⅓ to ⅔ of the arc length of the inner wall of the second coupling section.

Further, the height of the first positioning protrusion in the radial direction is 2 mm to 10 mm.

Further, the height of the second positioning protrusion in the radial direction is 2 mm to 10 mm.

Further, the first connecting mechanism includes a first bolt, a first bolt hole arranged at one end of the first coupling section and a second bolt hole arranged at one end of the second coupling section.

Further, the second connecting mechanism includes a second bolt, a third bolt hole arranged at the other end of the first coupling section and a fourth bolt hole arranged at the other end of the second coupling section.

Further, the connection of the first coupling section and the second coupling section is provided with a concave-convex structure that cooperated with each other.

Further, the connection of the first coupling section and the second coupling section is provide with an inclined port structure that cooperated with each other.

Further, the second connecting mechanism includes a first separated pin and a second separated pin respectively extending from both sides of the other end of the first coupling section, and a separated column connector extending from the other end of the second coupling section; a separated column is connected to the separated column connector, and the separated column connector extends between the first separated pin and the second separated pin so that the separated column is against the first separated pin and the second separated pin.

Further, the ends of the first separated pin and the second separated pin are provided with an arc-shaped surface that is adapted to the separated column, and the separated column is against the arc surface.

Further, one side of the outer surface of the first coupling section is provided with a first reinforcing rib connected with the first separated pin; the other side of the outer surface of the first coupling section is provided with a second stiffener connected with the second separated pin:

the first reinforcing rib and the first separated pin are integrally formed; the second reinforcing rib and the second separated pin are integrally formed.

Further, both sides of the inner surface in the first coupling section are provided with a first arc segment that is in contact with the pipe fitting or pipelines, and the first arc segment is semi elliptical-shaped;

a first radius from the center of the first arc segment to the end of the first arc segment is greater than a second radius from the center of the first arc segment to the middle end of the first arc segment.

Further, both sides of the inner surface of the second coupling section are provided with a second arc segment that is in contact with the pipe fitting or pipelines, and the second arc segment is semi elliptical-shaped;

a third radius from the center of the second arc segment to the end of the second arc segment is greater than a fourth radius from the center of the second arc segment to the middle end of the second arc segment.

A pipe clamp assembly includes a pipe clamp and a sealing member matching the pipe clamp; The sealing member is provided with a positioning groove matching the positioning protrusion.

Further, the number of the positioning grooves is equal to the number of the positioning protrusions.

Further, the positioning grooves are arc-shaped.

Further, the depths of the positioning grooves are 2 mm to 10 mm.

Further, the main body of the positioning grooves are circular ring structure.

Further, the sealing member is also provided with an auxiliary positioning protrusion.

Further, the sealing member is provided with a first auxiliary positioning protrusion at the connection between one end of the first coupling section and one end of the second coupling section.

Further, the sealing member is provided with a second auxiliary positioning protrusion at the connection of the other end of the first coupling section and the other end of the second coupling section.

A pipe clamp capable of realizing quick connection includes a third coupling section and a fourth coupling section, which are used to fix the pipe fittings together end-to-end;

one end of the third coupling section and one end of the fourth coupling section are connected through a plurality of first connecting mechanisms; the other end of the third coupling section and the other end of the fourth coupling section are connected through a plurality of second connecting mechanisms;

the inner walls of the third coupling section and the fourth coupling section are respectively provided with positioning protrusions.

Further, the positioning protrusions arranged on the third coupling section are symmetrically distributed with the positioning protrusions arranged on the fourth coupling section.

Further, the third coupling section is provided with a third positioning protrusion, and the fourth coupling section is provided with a fourth positioning protrusion.

Further, the third positioning protrusion is integrally formed with the third coupling section, and the fourth positioning protrusion is integrally formed with the fourth coupling section.

Further, the third positioning protrusion is arranged at the geometric center of the inner wall of the third coupling section;

the fourth positioning protrusion is arranged at the geometric center of the inner wall of the fourth coupling section.

Further, the longitudinal sections of the inner walls of the third coupling section and the fourth coupling section are both arc-shaped; the shapes of the third positioning protrusion and the fourth positioning protrusion are both arc-shaped.

Further, the arc length of the third positioning protrusion is ⅓ to ⅔ of the arc length of the longitudinal section of the inner wall of the third coupling section.

Further, the arc length of the fourth positioning protrusion is ⅓ to ⅔ of the arc length of the longitudinal section of the inner wall of the fourth coupling section.

Further, the height of the third positioning protrusion in the radial direction is 2 mm to 10 mm.

Further, the height of the fourth positioning protrusion in the radial direction is 2 mm to 10 mm.

Further, the first connecting mechanism includes a first bolt, a first bolt hole and a second bolt hole;

one end of the third coupling section is provided with a plurality of first bolt holes, one end of the fourth coupling section is provided with a plurality of second bolt holes, and the plurality of first bolts respectively pass through the plurality of first bolt holes and the plurality of second bolt holes to realize the connection of one end of the third coupling section and one end of the fourth coupling section.

Further, the second connecting mechanism includes a separated pin and a separated column connector, the other end of the third coupling section extends a plurality of separated pins, the other end of the fourth coupling section extends a plurality of separated pin connectors, the separated column connector is connected with a separated column, and the separated pin connector extends into the space between adjacent separated pins so that the separated column is against the separated pins.

Further, the end of the separated pin is provided with an arc-shaped surface adapted to the separated column, and the separated column is against the arc-shaped surface.

Further, a plurality of third reinforcing ribs connected with a plurality of separated pins are distributed on the outer surface of the third coupling section;

a plurality of fourth reinforcing ribs are distributed on the outer surface of the fourth coupling section;

the third reinforcing ribs are integrally formed with the separated pins.

Further, the longitudinal section of the inner surface of the third coupling section is semi elliptical-shaped; the fifth radius from the center to the end of the longitudinal section of the inner surface of the third coupling section is greater than the sixth radius from the center to the middle end;

the longitudinal section of the inner surface of the fourth coupling section is semi elliptical-shaped; the seventh radius from the center to the end of the longitudinal section of the inner surface of the fourth coupling section is greater than the eighth radius from the center to the middle end.

A pipe clamp assembly includes the pipe clamp described above capable of realizing quick connection, and further includes a sealing member matching the pipe clamp; the seal component is provided with a positioning groove matching the positioning protrusion;

The pipe clamp and pipe clamp assembly capable of realizing quick connection provided by the invention at least includes the following beneficial effects:

(1) By providing positioning protrusions for positioning the pipe fittings on the inner walls of the first coupling section and the second coupling section. The positioning is firm and reliable, which can effectively save materials and reduce production costs;

(2) Both ends of the first coupling section and the second coupling section can be connected by a screw connection, or by a screw connection at one end and a separated pin connection at the other end, with high reliability;

(3) The design of the reinforcing ribs on the first coupling section and the second coupling section can transmit the stress of the pipe clamp when the pipe clamp is locked to the separated pin connectors and the separated column connectors, which reduces the stress concentration of the pipe clamp, saves more material and gives full play to its performance more effectively compared with the way of increasing the thickness to strengthen the strength, (4) The contact parts of the first coupling section and the second coupling section and the pipe fittings are all semi elliptical-shaped, so the enclosed shape is ellipse, which can make the fastening force at the time of connecting the two ends of the first coupling section and the second coupling section generate centripetal deformation force through the lever torque produced by the cooperation of the longer radius and the shorter radius of the ellipse, so as to hold the pipe fittings tightly and make the inner walls of the first coupling section and the second coupling section fit the pipe fittings better; (5) The positioning grooves on the seal are matched with the positioning protrusion on the coupling sections to achieve better positioning and sealing.

DETAILED DESCRIPTION OF THE INVENTION

In order to better understand the above technical scheme, the above technical scheme will be described in detail below in combination with the description, appended drawings and specific embodiments.

Referring to FIGS. 1-10, a pipe clamp 100 that can realize quick connection is provided in a first embodiment of the invention, including a first coupling section 11 and a second coupling section 12, which are used to fix the pipe fittings together end-to-end; one end of the first coupling section 11 and one end of the second coupling section 12 are connected through a first connecting mechanism, and the other end of the first coupling section 11 and the other end of the second coupling section 12 are connected through a second connecting mechanism;

the inner walls of the first coupling section 11 and the second coupling section 12 are respectively provided with positioning protrusions.

Specifically, the two pipe fittings are connected end-to-end into the pipe clamp 100, and the ends of the pipe fittings are positioned through the positioning protrusions. The positioning protrusions are integrally formed with the first coupling section 11 and the second coupling section 12, and the structure is firm, which is different from the flexible positioning of the tongue portion of the sealing member, the positioning is more firm. The positioning protrusions arranged on the first coupling section 11 are symmetrically distributed with the positioning protrusions arranged on the second coupling section 12. The number of positioning protrusions can be multiple, and the size is set according to actual requirements. The positioning protrusions on the first coupling section 11 and the positioning protrusions on the second coupling section 12 are symmetrically distributed to ensure the reliability of positioning.

Figure 2:
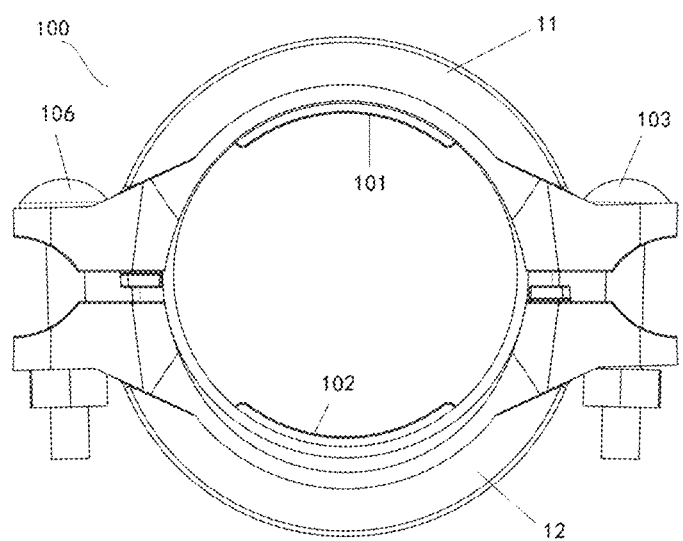
FIG. 2 is a cross-sectional view according to a first embodiment of a pipe clamp provided by the invention.
Figure 3:
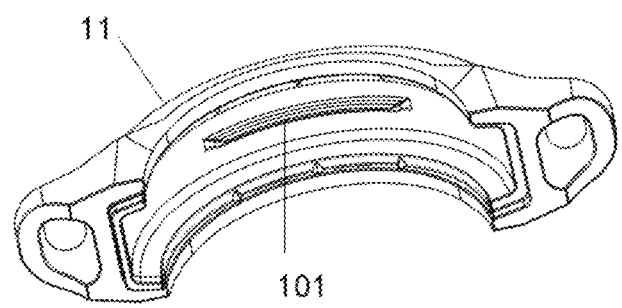
FIGS. 3-5 are structural diagrams of a first coupling section of a pipe clamp according to a first embodiment provided by the invention.
Figure 4:
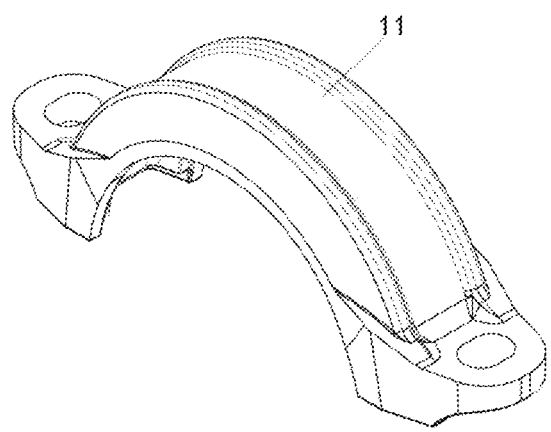

The pipe clamp provided in this embodiment is described by taking two positioning protrusions as examples. Referring to FIG. 2, a first coupling section 11 is provided with a first positioning protrusion 101, and a second coupling section 12 is provided with a second positioning protrusion 102.

The first positioning protrusion 101 is integrally formed with the first coupling section 11, and the second positioning protrusion 102 is integrally formed with the second coupling section 12. The first positioning protrusion 101 and the first coupling section 11 are integrally cast, and the second positioning protrusion 102 and the second coupling section 12 are integrally cast to ensure the stability of the first positioning protrusion 101 and the second positioning protrusion 102.

The first positioning protrusion 101 is arranged at the geometric center of the inner wall of the first coupling section 11; The second positioning protrusion 102 is arranged at the geometric center of the inner wall of the second coupling section 12. The inner walls of the first coupling section 11 and the second coupling section 12 are both arc-shaped; the first positioning protrusion 101 and the second positioning protrusion 102 are both arc-shaped.

As a preferred embodiment, the arc length of the first positioning protrusion 101 is ⅓ to ⅔ of the arc length of the inner wall of the first coupling section 11, and the arc length of the second positioning protrusion 102 is ⅓ to ⅔ of the arc length of the inner wall of the second coupling section 12; materials are saved and the production costs are reduced while ensuring the positioning reliability.

Further, the height of the first positioning protrusion 101 in the radial direction is 2 mm to 10 mm. The height of the second positioning protrusion 102 in the radial direction is 2 mm to 10 mm.

Figure 1:
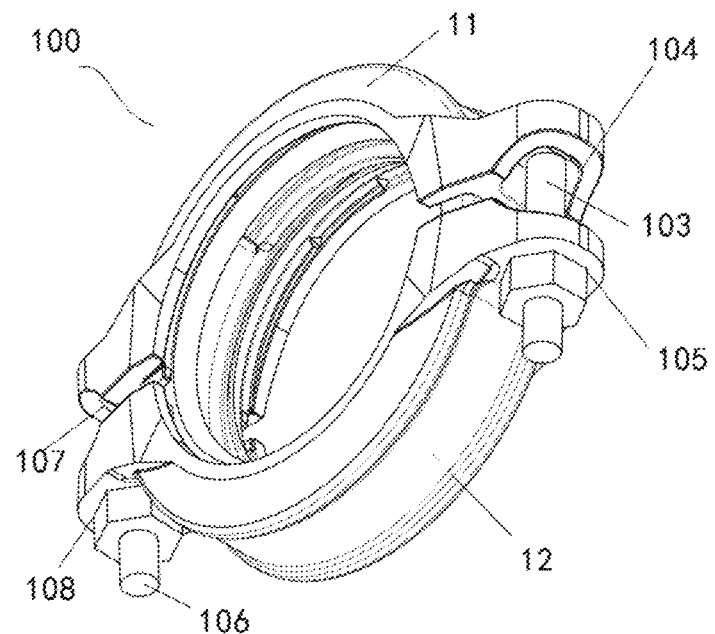
FIG. 1 is a structural diagram according to a first embodiment of a pipe clamp provided by the invention.

Referring to FIGS. 1-2, in an optional embodiment, the first connecting mechanism includes a first bolt 103, a first bolt hole 104 arranged at one end of the first coupling section 11 and a second bolt hole 105 arranged at one end of the second coupling section. The first bolt 103 passes through the first bolt hole 104 and the second bolt hole 105 to realize the connection of one end of the first coupling section 11 and one end of the second coupling section 12. The second connecting mechanism includes a second bolt 106, a third bolt hole 107 arranged at the other end of the first coupling section 11 and a fourth bolt hole 108 arranged at the other end of the second coupling section 12. The second bolt 106 passes through the third bolt hole 107 and the fourth bolt hole 108 to realize the connection of the other end of the first coupling section 11 and the other end of the second coupling section 12. That is, both ends of the first coupling section 11 and the second coupling section 12 are connected by a screw connection, which is simple and reliable.

Referring to FIGS. 1-4, the pipe clamp 100 with double-bolt structure provided by the embodiment can be a rigid pipe clamp, and the connection of the first coupling section 11 and the second coupling section 12 is cooperatively connected through a mutually cooperated concave-convex structure 140.

Referring to FIGS. 6-10, the pipe clamp 100 with the double-bolt structure provided in this embodiment is a flexible pipe clamp, and the connection of the first coupling section 11 and the second coupling section 12 is an inclined port connection, that is, the connection of the first coupling section 11 and the second coupling section 12 is provided with a mutually cooperated inclined port structure 140.

Referring to FIGS. 11-15, as another optional embodiment, the first connecting mechanism includes a first bolt 103, a first bolt hole 104 arranged at one end of the first coupling section 11 and a second bolt hole 105 arranged at one end of the second coupling section. The first bolt 103 passes through the first bolt hole 104 and the second bolt hole 105 to realize the connection of one end of the first coupling section 11 and one end of the second coupling section 12. The second connecting mechanism includes a first separated pin 109 and a second separated pin 110 respectively extending from both sides of the other end of the first coupling section 11, and a separated column connector 111 extending from the other end of the second coupling section 12; a separated column 112 is connected to the separated column connector 111, and the separated column connector 111 extends and inserts between the first separated pin 109 and the second separated pin 110 so that the separated column 112 is against the first separated pin 109 and the second separated pin 110. The ends of the first separated pin 109 and the second separated pin 110 are provided with an arc-shaped surface matching the column 112, and the separated column 112 is against the arc-shaped surface. That is, one end of the first coupling section 11 is connected to one end of the second coupling section 12 with screws; and the other end of the first coupling section 11 is connected to the other end of the second coupling section 12 with pins. This connection can effectively improve the assembly efficiency.

One side of the outer surface of the first coupling section 11 is provided with a first reinforcing rib 113 connected with the first separated pin 109; the other side of the outer surface of the first coupling section 11 is provided with a second reinforcing rib 114 connected with the second separated pin. The first reinforcing rib 113 and the first separated pin 109 are integrally formed; the second reinforcing rib 114 is integrally formed with the second separated pin 110. A third reinforcing rib 115 and a fourth reinforcing rib 116 are respectively arranged on both sides of the outer surface of the second coupling section 12. The design of the reinforcing ribs on the first coupling section and the second coupling section can transmit the stress when the pipe clamp is locked to the other separated pin connectors and the other separated column connectors, reducing the stress concentration of the pipe clamp, and saving more materials and giving more effective play to its performance compared with the way of strengthening the strength by increasing the thickness.

Figure 5:
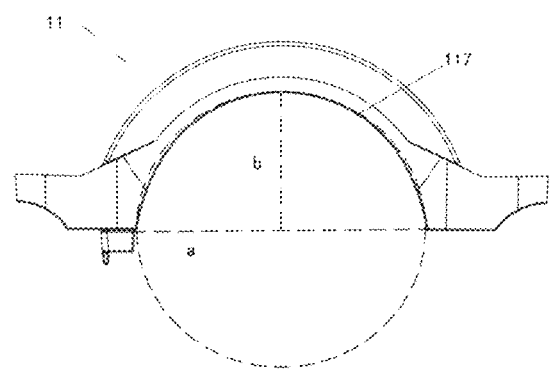
Figure 6:
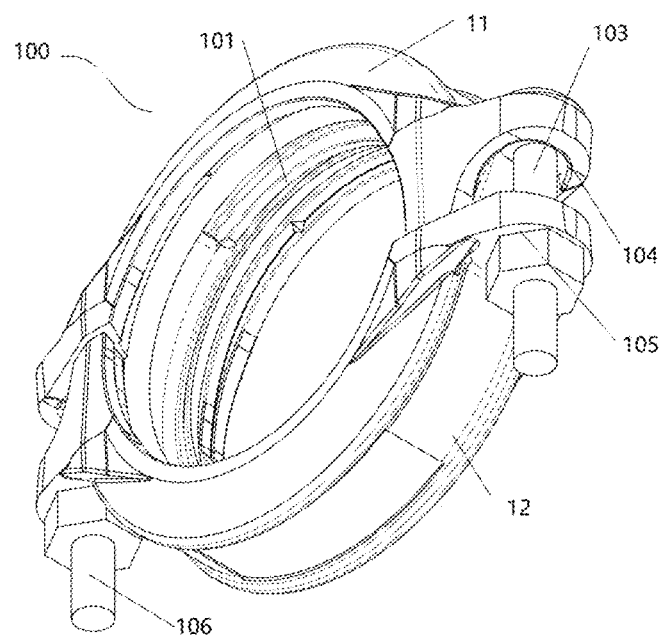
FIGS. 6 to 8 are structural diagrams of another implementation of a first embodiment of a pipe clamp provided by the invention.
Figure 7:
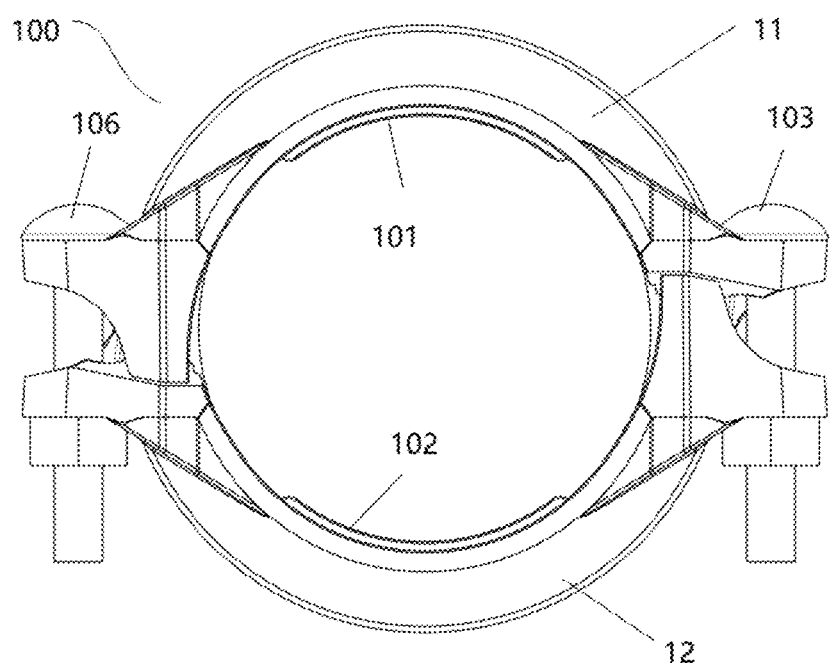
Figure 8:
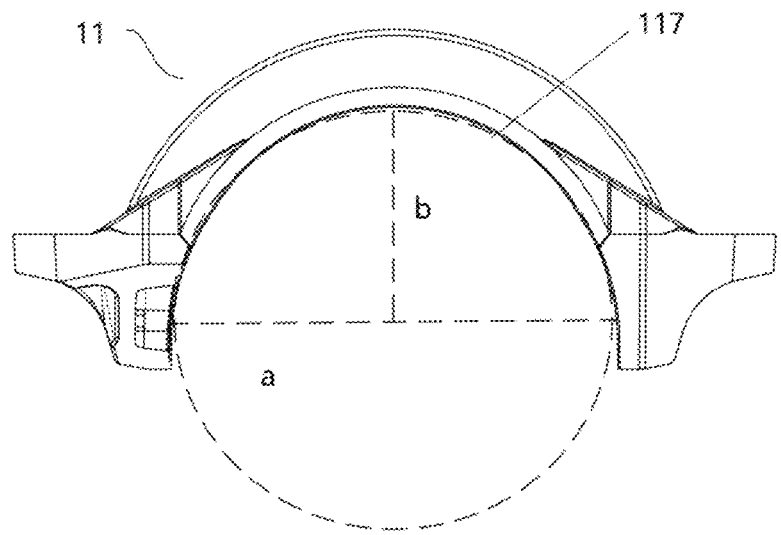
Figure 9:
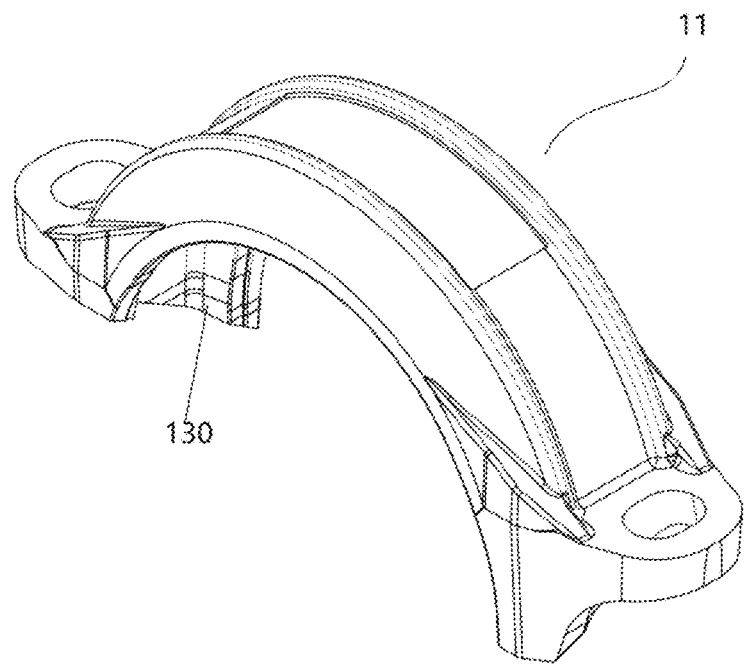
FIGS. 9-10 are structural diagrams of a first coupling section and a second coupling section in a first embodiment of a pipe clamp provided by the invention.
Figure 10:
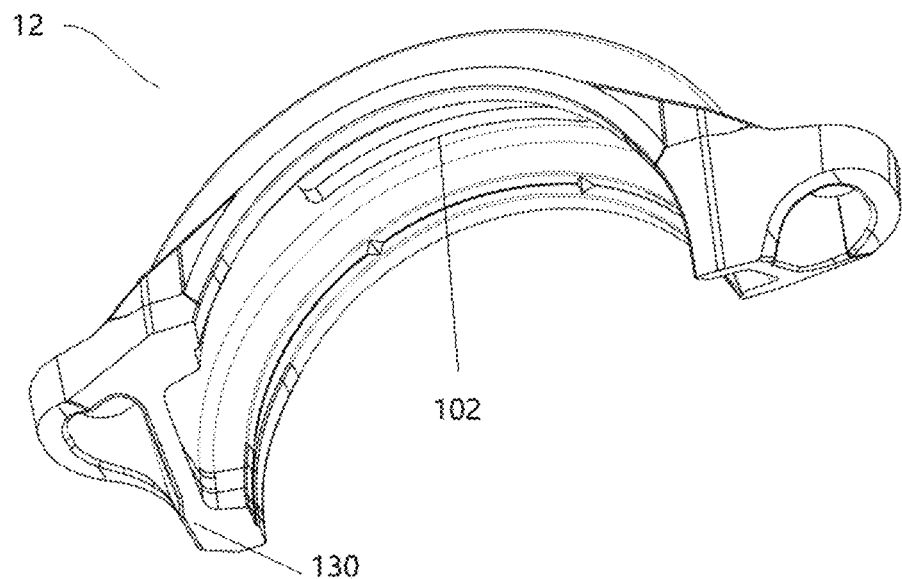
Figure 11:
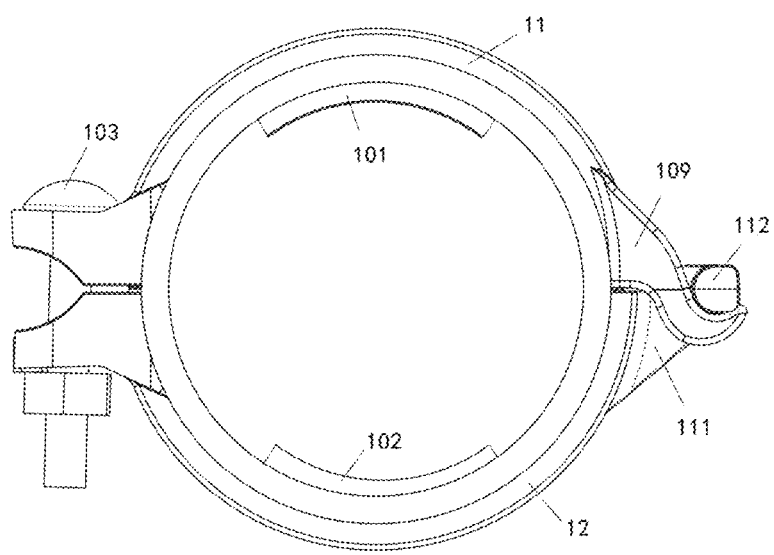
FIG. 11 is a structural diagram according to a first embodiment of a pipe clamp provided by the invention.
Figure 12:
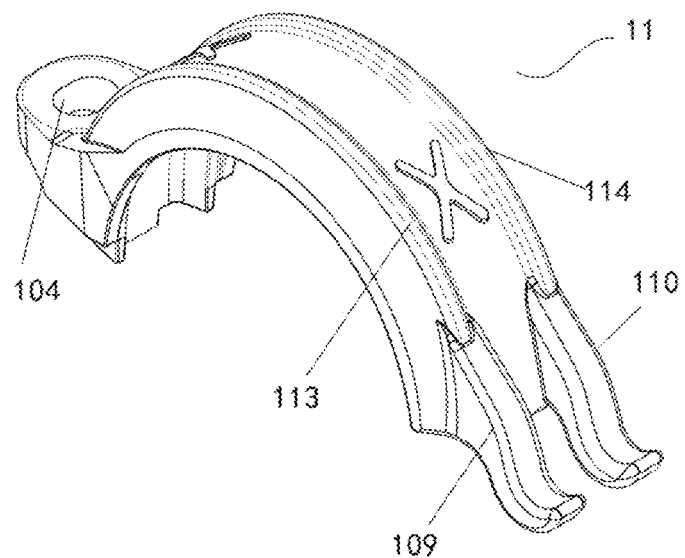
FIG. 12 is a structural diagram of a first coupling section according to a first embodiment of a pipe clamp provided by the invention.
Figure 13:
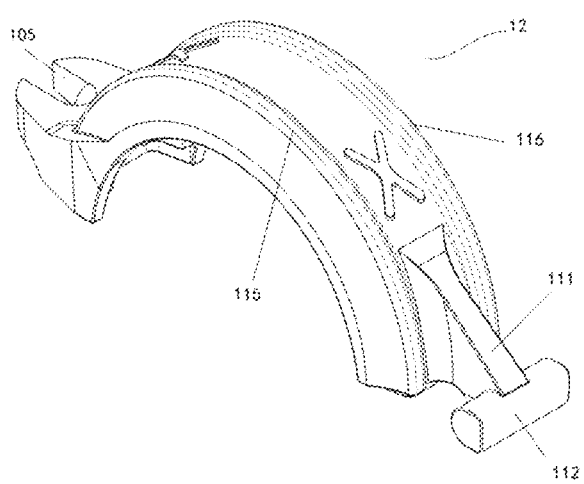
FIG. 13 is a structural diagram of a second coupling section according to a first embodiment of a pipe clamp provided by the invention.
Figure 14:
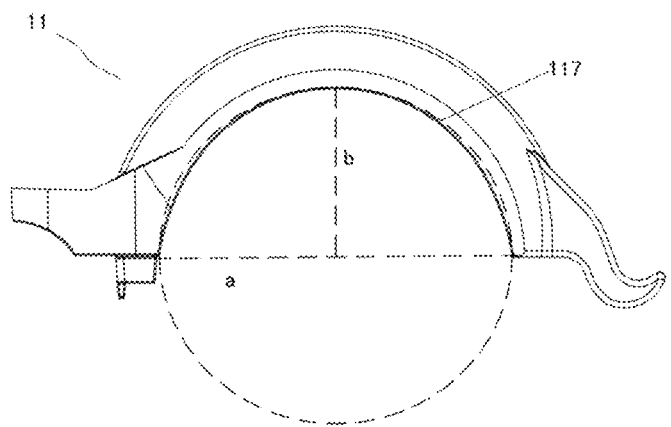
FIG. 14 is a side view of a first coupling section according to a first embodiment of a pipe clamp provided by the invention.
Figure 15:
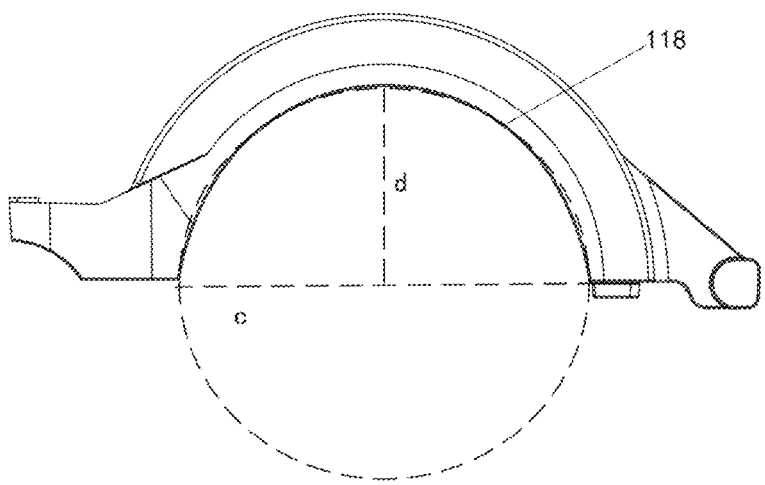
FIG. 15 is a side view of a second coupling section according to a first embodiment of a pipe clamp provided by the invention.

Referring to FIGS. 5, 8 and 14, both sides of the inner surface of the first coupling section 11 are provided with a first arc segment 117 that is in contact with the pipe fitting. The first arc segment 117 is semi elliptical-shaped. The first radius a from the center of the first arc segment 117 to the end of the first arc segment 117 is greater than the second radius b from the center of the first arc segment 117 to the middle end of the first arc segment 117, and the first radius a is greater than the second radius b by about 1-5 mm. Referring to FIG. 15, both sides of the inner surface of the second coupling section 12 are provided with a second arc segment 118 that is in contact with the pipe fitting, and the second arc segment 118 is semi elliptical-shaped. The third radius c from the center of the second arc segment 118 to the end of the second arc segment 118 is greater than the fourth radius d from the center of the second arc segment 118 to the middle end of the second arc segment 118. The third radius c is greater than the fourth radius d by about 1-5 mm.

When the first coupling section 11 and the second coupling section 12 are bridged on the end-to-end pipe fittings, the inner part of the first coupling section 11 and the second coupling section 12 is formed in a nearly circular structure integrated closely with the pipe fittings fit. Since the contact part of the first coupling section 11 and the second coupling section 12 in contact with the pipe fittings are both semi elliptical-shaped, the enclosed shape is an ellipse, which make the fastening force at the time of connecting the two ends of the first coupling section 11 and the second coupling section 12 generate a centripetal deformation force through the lever torque produced by the cooperation of the longer radius and the shorter radius of the ellipse, so as to hold the pipe fittings tightly and make the inner walls of the first coupling section 11 and the second coupling section 12 fit the pipe fittings better.

Figure 16:
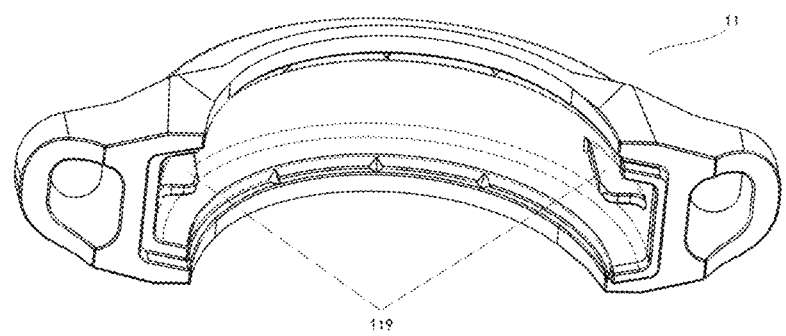
FIG. 16 is a structural diagram of another implementation of a first coupling section according to a first embodiment of a pipe clamp provided by the invention.
Figure 17:
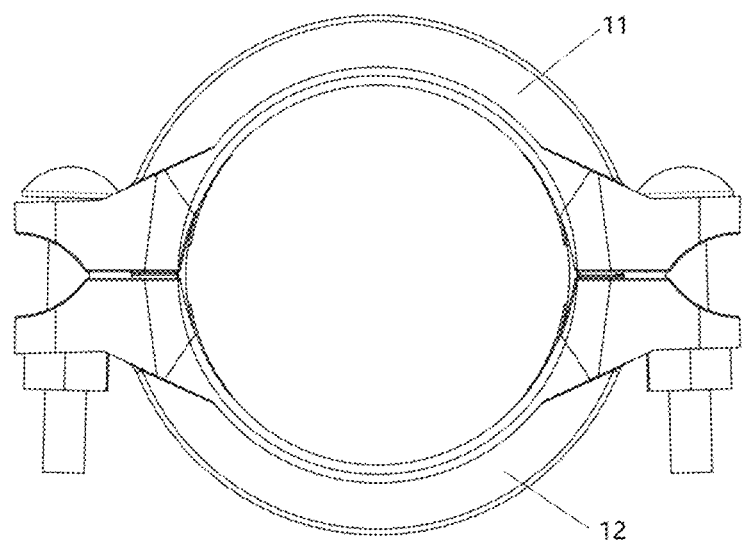
FIGS. 17-19 are structural diagrams of another implementation according to a first embodiment of a pipe clamp provided by the invention.
Figure 18:
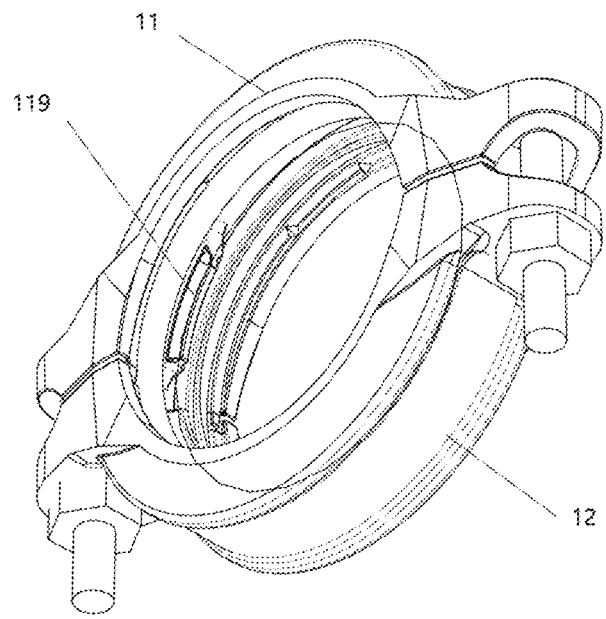

Referring to FIGS. 16-18, the pipe clamp 100 provided by this embodiment includes a first coupling section and a second coupling section, which are used to fix the pipe fittings end-to-end together; one end of the first coupling section and one end of the second coupling section are connected through a first connecting mechanism, and the other end of the first coupling section and the other end of the second coupling section are connected through a second connecting mechanism; two positioning protrusions 119 are arranged on the inner wall of the first coupling section 11, and two positioning protrusions are arranged on the inner wall of the second coupling section. The two positioning protrusions 119 of the first coupling section 11 are respectively arranged at the positions close to the end of the inner wall of the first coupling section 11. Similarly, the two positioning protrusions of the second coupling section are respectively arranged at the positions close to the end of the inner wall of the second coupling section. The two positioning protrusions of the first coupling section and the two positioning protrusions of the second coupling section are symmetrical. The number and distribution of positioning protrusions can be set according to actual needs.

Figure 19:
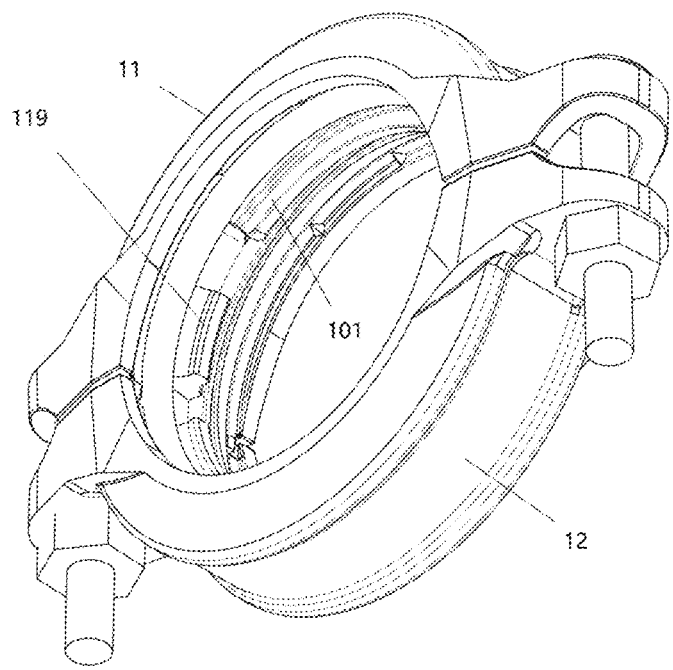

Referring to FIG. 19, the pipe clamp 100 provided by the embodiment includes a first coupling section and a second coupling section, which are used to fix the pipe fittings together end-to-end; one end of the first coupling section is screwed to one end of the second coupling section, and the other end of the first coupling section is screwed to the other end of the second coupling section; a first positioning protrusion 101 is arranged at the geometric center of the inner wall of the first coupling section 11, two positioning protrusions 119 are arranged close to the end, a second positioning protrusion is arranged at the geometric center of the inner wall of the second coupling section, and two positioning protrusions are arranged close to the end. The pipe fittings are firmly and reliably positioned by setting a positioning protrusion for positioning the pipe fittings on the inner walls of the first coupling section and the second coupling section in the pipe clamp 100 provided in this embodiment, which can effectively save materials and reduce production costs.

Figure 20:
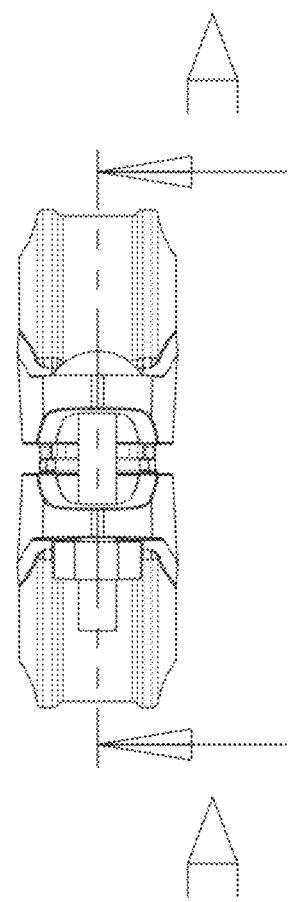
FIG. 20 is a structural diagram according to a first embodiment of a pipe clamp assembly provided by the invention.
Figure 21:
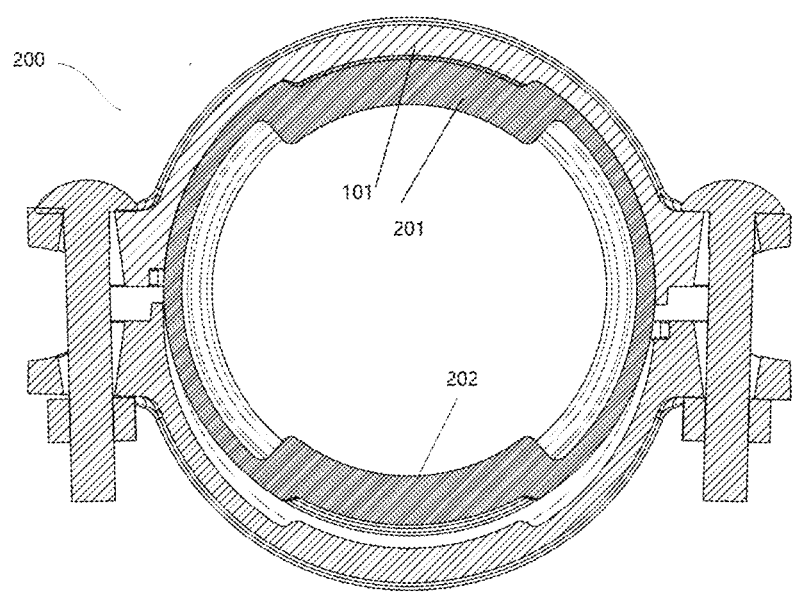
FIG. 21 is a cross-sectional view taken along line A-A of FIG. 20.
Figure 22:
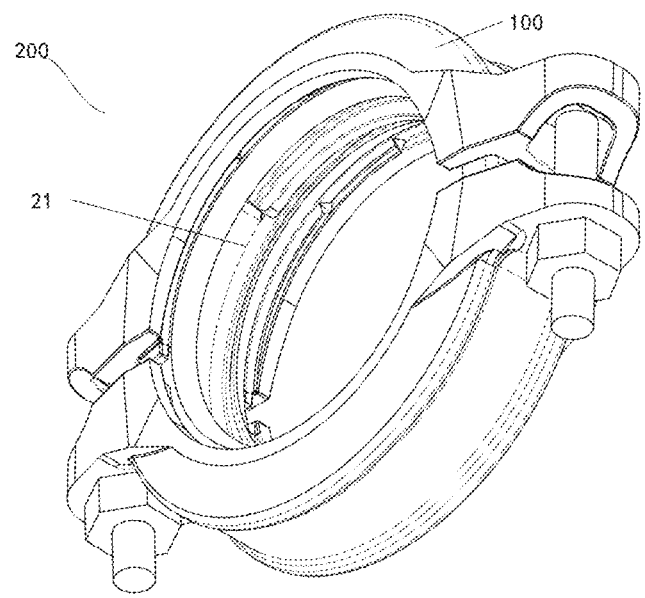
FIG. 22 is a structural diagram according to a first embodiment of a pipe clamp assembly provided by the invention.

Referring to FIGS. 20 and 22, the second embodiment of the invention provides a pipe clamp assembly 200, including the pipe clamp 100 above and a sealing member 21 in cooperation with the pipe clamp 100;

The sealing member 21 is provided with positioning grooves matching the positioning protrusions.

Figure 23:
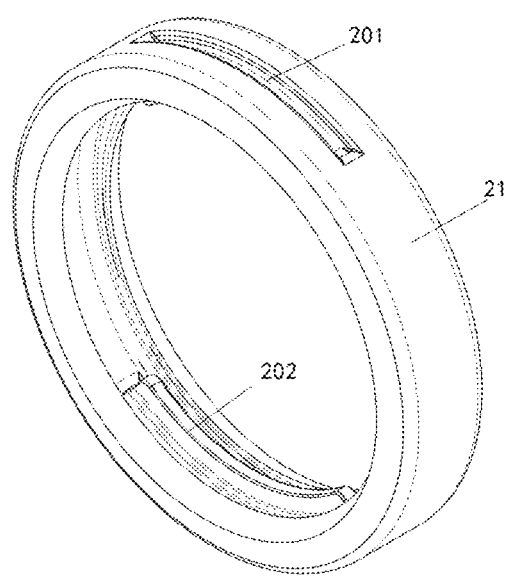
FIG. 23 is a structural diagram of an embodiment of the sealing member according to a first embodiment of a pipe clamp assembly provided by the invention.

The main body of the sealing member 21 is a circular ring structure, and the shape and number of positioning grooves are matched with the shape and number of positioning protrusions of the pipe clamp 100. Referring to FIGS. 1 and 2, the first coupling section 11 of the pipe clamp 100 is provided with a first positioning protrusion 101, the second coupling section 12 is provided with a second positioning protrusion 102, and the structure of the matched sealing member 21 is shown in FIG. 23. The sealing member 21 is provided with a first positioning groove 201 matching the first positioning protrusion 101 and a second positioning groove 201 matching the second positioning protrusion 102. The first positioning groove 201 and the second positioning groove 202 are symmetrical, the shape, size, depth and setting position of the first positioning groove 201 adapt to the first positioning protrusion 101, and the shape, size, depth and setting position of the second positioning groove 202 adapt to the second positioning protrusion 102. The depths of the first positioning groove 101 and the second positioning groove 102 are 2 mm-10 mm.

The sealing member 21 is used to prevent the fluid in the pipe fitting from leaking.

Figure 24:
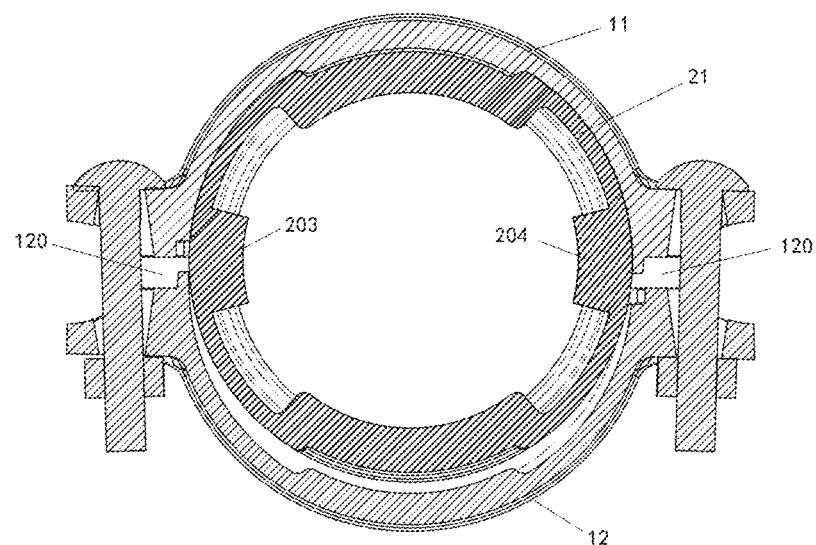
FIG. 24 is a cross-sectional view according to a first embodiment of a pipe clamp assembly provided by the invention.

Referring to FIG. 24, a pair of notches 120 are formed at the connection of the first coupling section 11 and the second coupling section 12. When the first coupling section 11 and the second coupling section 12 are in a predetermined spacing relationship, the notch 120 provides a gap for inserting the end of the pipe fitting into the space between the first coupling section 11 and the second coupling section 12. The notch 120 forms an obvious gap after the pipe fitting is assembled. The sealing member is easy to be damaged under pressure at this position, and therefore the sealing member is under the risk of fluid ejection.

Figure 25:
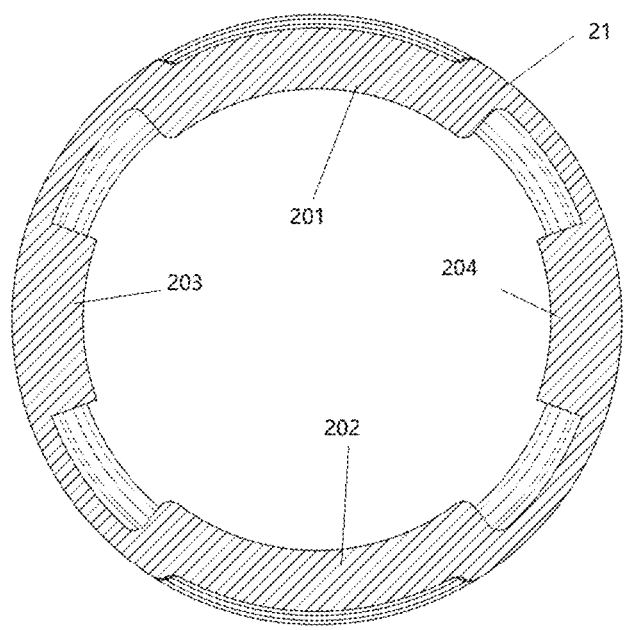
FIG. 25 is a cross-sectional view according to a first embodiment of the sealing member in a pipe clamp assembly provided by the invention.

Therefore, in the pipe clamp assembly provided by this embodiment, referring to FIG. 25, the sealing member 21 is also provided with an auxiliary positioning protrusion, including a first auxiliary positioning protrusion 203 at the connection of one end of the first coupling section 11 and one end of the second coupling section 12, and a second auxiliary positioning protrusion 204 at the connection of the other end of the first coupling section 11 and the other end of the second coupling section 12.

On the one hand, the setting of the first auxiliary positioning protrusion 203 and the second auxiliary positioning protrusion 204 can further ensure the effective positioning of the pipe fitting. On the other hand, it can also increase the thickness and pressure tolerant capability of this position to avoid the damage to this position, which cause the fluid ejection.

Figure 26:
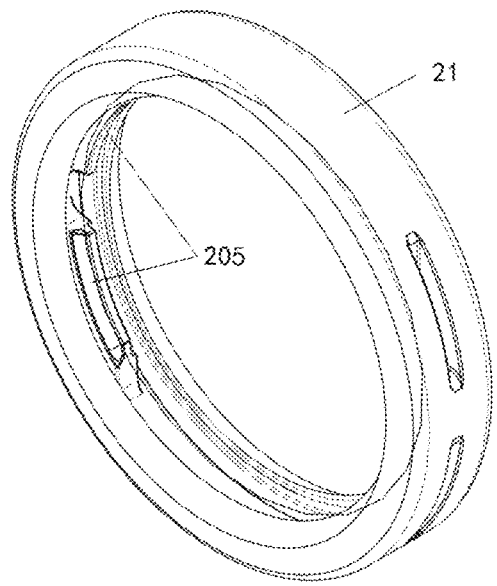
FIG. 26 is a structural diagram according to a first embodiment of a sealing member in a pipe clamp assembly provided by the invention.

Referring to FIGS. 16-18, the pipe clamp 100 includes a first coupling section 11 and a second coupling section 12. The inner wall of the first coupling section 11 is provided with two positioning protrusions 119, and the inner wall of the second coupling section 12 is provided with two positioning protrusions 119. The two positioning protrusions 119 of the first coupling section 11 are respectively arranged at the position close to the end of the inner wall of the first coupling section 11. Similarly, the two positioning protrusions 119 of the second coupling section 12 are respectively arranged at the position close to the end of the inner wall of the second coupling section 12. The two positioning protrusions 119 of the first coupling section 11 and the two positioning protrusions of the second coupling section 12 are symmetrical. The sealing member 21 matching the pipe clamp is shown in FIG. 26. The sealing member 21 includes four positioning grooves 205. The shape, size and setting position of the positioning groove 205 are matched with the positioning protrusion 119.

Figure 27:
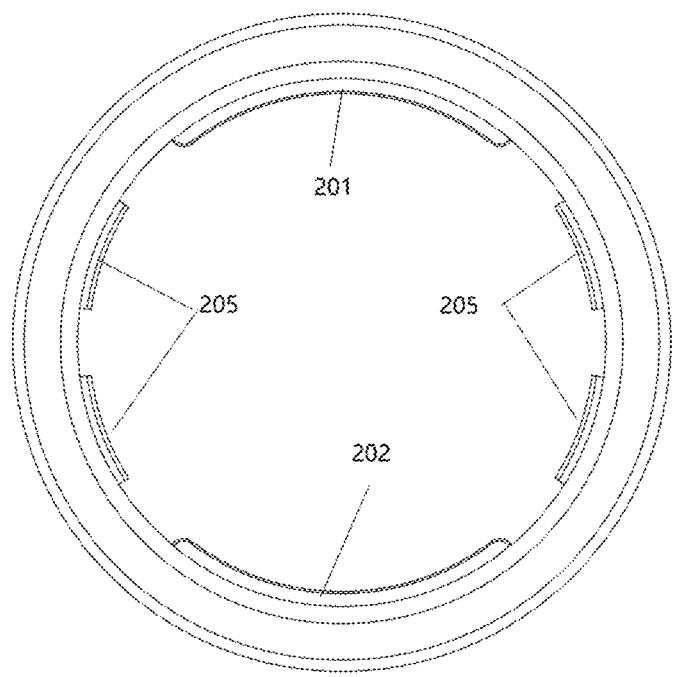
FIG. 27 is a structural diagram of another implementation according to a first embodiment of the sealing member in a pipe clamp assembly provided by the invention.
Figure 28:
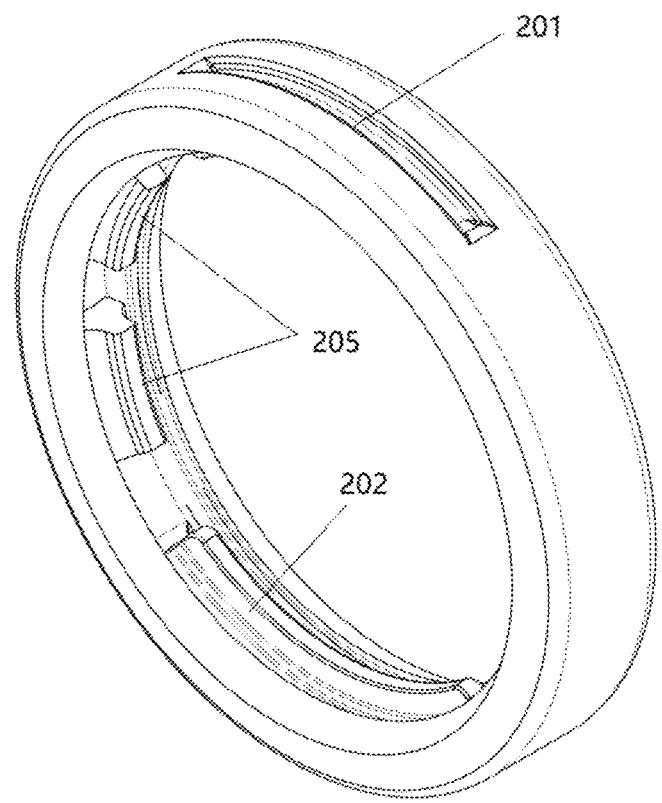
FIG. 28 is a three-dimensional structural diagram of another implementation according to a first embodiment of the sealing member in a pipe clamp assembly provided by the invention.
Figure 29:
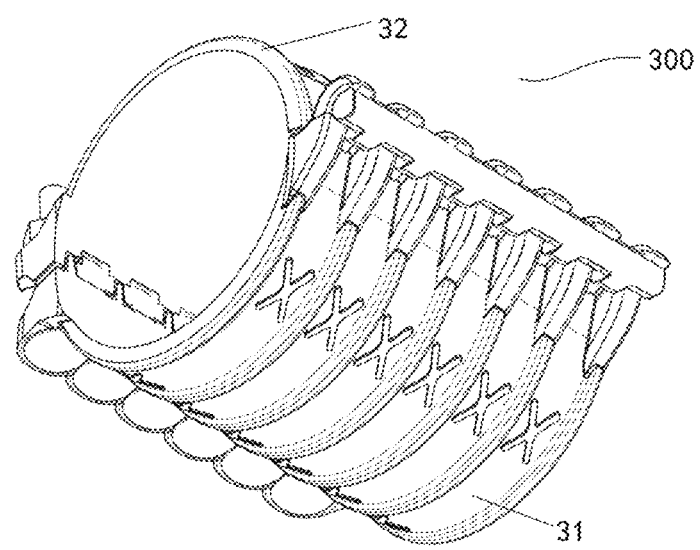
FIG. 29 is a structural diagram according to a second embodiment of a pipe clamp provided by the invention.
Figure 30:
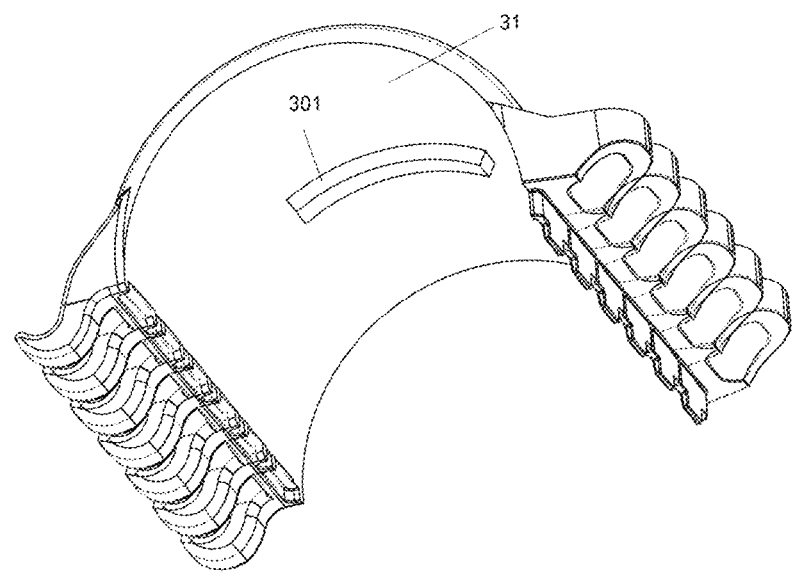
FIG. 30 is a structural diagram of a first coupling section according to a second embodiment of a pipe clamp provided by the invention.
Figure 31:
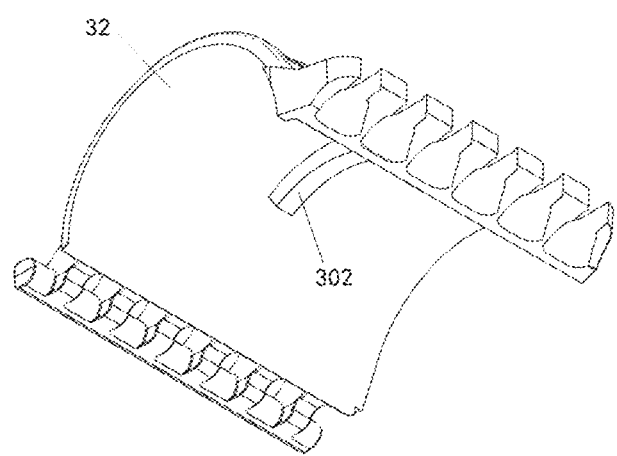
FIG. 31 is a structural diagram of a second coupling section according to a second embodiment of a pipe clamp provided by the invention.
Figure 32:
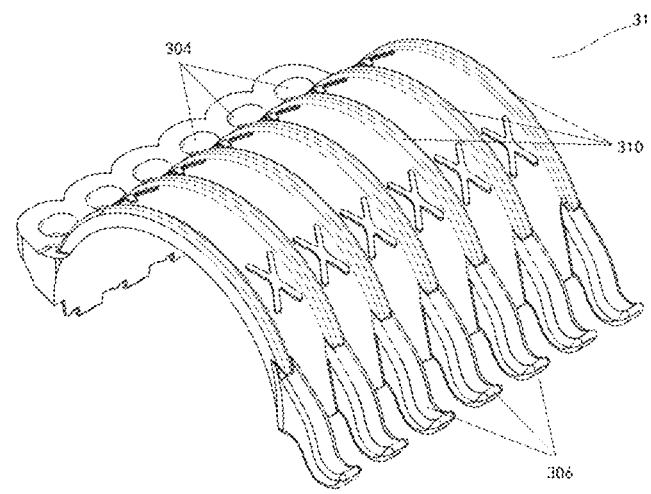
FIG. 32 is a structural diagram of a first coupling section according to a second embodiment of a pipe clamp provided by the invention.
Figure 33:
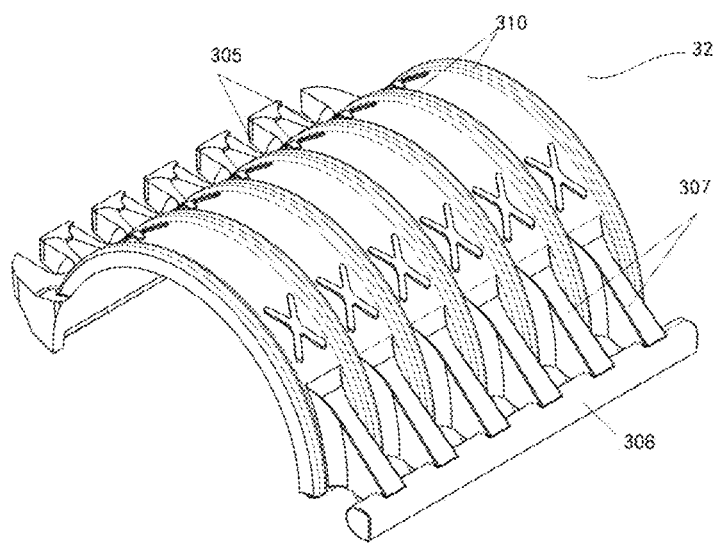
FIG. 33 is a structural diagram of a second coupling section according to a second embodiment of a pipe clamp provided by the invention.

Referring to FIG. 19, the pipe clamp 100 includes a first coupling section and a second coupling section for fixing the pipe fittings together end-to-end; one end of the first coupling section is screwed to one end of the second coupling section, and the other end of the first coupling section is screwed to the other end of the second coupling section; a first positioning protrusion 101 is arranged at the geometric center of the inner wall of the first coupling section 11, two positioning protrusions 119 are arranged close to the end, a second positioning protrusion is arranged at the geometric center of the inner wall of the second coupling section, and two positioning protrusions are arranged close the end. As shown in FIGS. 27-28, the adapted sealing member includes a first positioning groove 101, a second positioning groove 102 and four positioning grooves 205.

In the pipe clamp assembly provided by this embodiment, the sealing member is provided with positioning grooves matching the positioning protrusions, on the one hand, fluid leakage is prevented, and on the other hand, compared with the positioning of the tongue portion, it can save more materials and reduce the production costs. In addition, the pressure tolerance capability can be improved by adding auxiliary positioning protrusions.

Referring to FIGS. 29-33, a third embodiment of the present invention provides a pipe clamp 300 capable of realizing quick connection, including a third coupling section 31 and a fourth coupling section 32, which are used to fix the pipe fittings together end-to-end;

one end of the third coupling section 31 and one end of the fourth coupling section 32 are connected through a plurality of first connecting mechanisms, and the other end of the third coupling section 31 and the other end of the fourth coupling section 32 are connected through a plurality of second connecting mechanisms;

the inner walls of the third coupling section 31 and the fourth coupling section 32 are respectively provided with positioning protrusions.

The third coupling section 31 and the fourth coupling section 32 have a longer length in the axial direction, so one end is connected by a plurality of first connecting mechanisms, and the other end is connected by a plurality of second connecting mechanisms.

The positioning protrusions arranged on the third coupling section 31 are symmetrically distributed with the positioning protrusions arranged on the fourth coupling section 32. As an optional embodiment, the third coupling section is provided with a third positioning protrusion 301, and the fourth coupling section 32 is provided with a fourth positioning protrusion 302. The third positioning protrusion 301 is integrally formed with the third coupling section 31, and the fourth positioning protrusion 302 is integrally formed with the fourth coupling section 41. The third positioning protrusion 301 is arranged at the geometric center of the inner wall in the third coupling section 31; the fourth positioning protrusion 302 is arranged at the geometric center of the inner wall in the fourth coupling section 32. The longitudinal sections of the inner walls in the third coupling section 31 and the fourth coupling section 32 are both arc-shaped. The third positioning protrusion 301 and the fourth positioning protrusion 302 are both arc-shaped. The arc length of the third positioning protrusion 301 is ⅓ to ⅔ of the arc length of the longitudinal section of the inner wall of the third coupling section 31. The arc length of the fourth positioning protrusion 302 is ⅓ to ⅔ of the arc length of the longitudinal section of the inner wall of the fourth coupling section 32. The height of the third positioning protrusion 301 in the radial direction is 2 mm to 10 mm. The height of the fourth positioning protrusion 302 in the radial direction is 2 mm to 10 mm. Further, referring to FIGS. 32 and 33, the first connecting mechanism includes a first bolt, a first bolt hole 304 and a second bolt hole 305; one end of the third coupling section 31 is provided with a plurality of first bolt holes 304, one end of the fourth coupling section 32 is provided with a plurality of second bolt holes 302, and a plurality of first bolts 303 respectively pass through a plurality of first bolt holes 304 and a plurality of second bolt holes 305 to realize the connection of one end of the third coupling section 31 and one end of the fourth coupling section 32.

Figure 34:
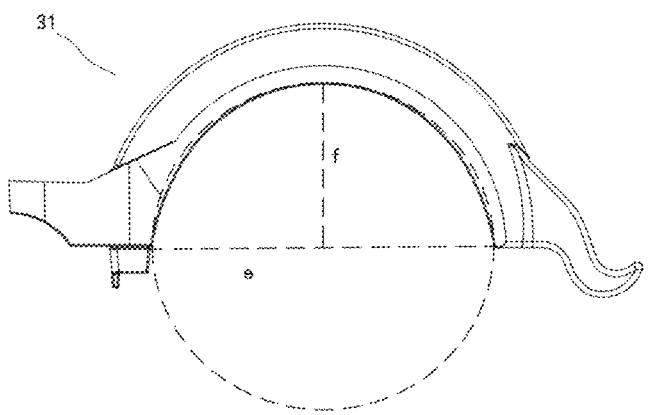
FIG. 34 is a side view of a first coupling section according to a second embodiment of a pipe clamp provided by the invention.
Figure 35:
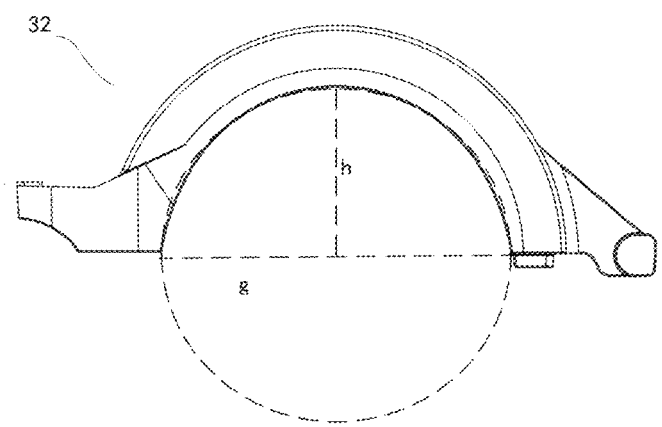
FIG. 35 is a side view of a second coupling section according to a second embodiment of a pipe clamp provided by the invention.

The second connecting mechanism includes a separated pin 306 and a separated column connector 307. The other end of the third coupling section 31 extends a plurality of separated pins 306, and the other end of the fourth coupling section 32 extends a plurality of separated column connectors 307. The separated column connector 307 is connected with a separated column 308, and the separated column connector 307 extends and inserts between the adjacent separated pins so that the separated column 308 is against the separated pin 306. The end of the other separated pin 306 is provided with an arc surface adapted to the separated column 308, and the separated column 308 is against the arc surface. A plurality of third reinforcing ribs 309 connected with a plurality of separated pins 306 are distributed on the outer surface of the third coupling section 31;

a plurality of fourth reinforcing ribs 310 are distributed on the outer surface of the fourth coupling section 32; the third reinforcing rib 309 is integrally formed with the separated pin 306. Referring to FIGS. 34 and 35, the longitudinal section of the inner surface of the third coupling section 31 is semi elliptical-shaped; the fifth radius e from the center to the end of the longitudinal section of the inner surface of the third coupling section 31 is greater than the sixth radius f from the center to the middle end. The longitudinal section of the inner surface of the fourth coupling section 32 is semi elliptical-shaped; the seventh radius g from the center to the end of the longitudinal section of the inner surface of the fourth coupling section 32 is greater than the eighth radius h from the center to the middle end.

To sum up, the pipe clamp 300 provided in this embodiment is provided with positioning protrusions for positioning the pipe fittings on the inner walls of the first coupling section and the second coupling section. The positioning is firm and reliable, which can effectively save materials and reduce production costs. One end adopts the way of pin connection with multiple pin connector mechanisms, and the other end adopts the way of screw connection with multiple screw connection mechanisms, which can effectively improve the assembly efficiency. In addition, the design of reinforcing ribs on the third coupling section and the fourth coupling section can transmit the stress when the pipe clamp is locked to other separated pins and separated columns, reducing the stress concentration of the pipe clamp, saving the materials, and making the materials give more effective play to its performance.

Figure 36:
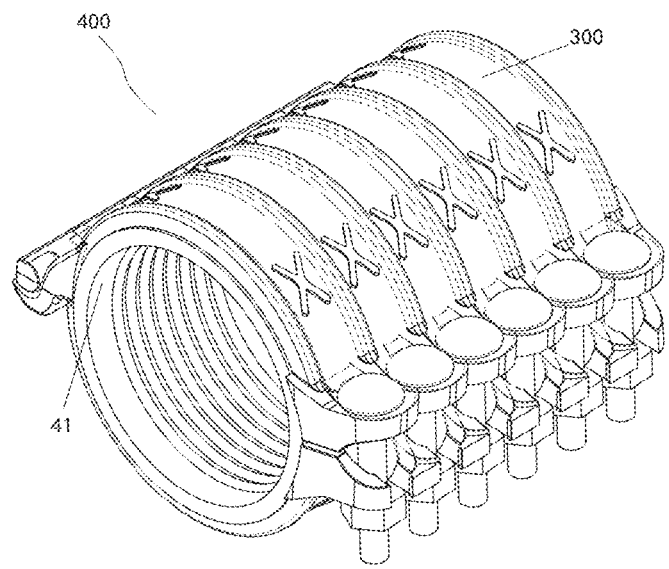
FIG. 36 is a structural diagram according to a second embodiment of a pipe clamp assembly provided by the invention.

Referring to FIG. 36, the fourth embodiment of the present invention provides a pipe clamp assembly 400, including the pipe clamp 300 above that can realize quick connection, and further includes a sealing member 41 adapted to the pipe clamp; The sealing member 41 is provided with positioning grooves adapted to the positioning protrusions. The main body of the sealing member 41 is a circular ring structure, and the shape and number of positioning grooves are adapted to the shape and number of positioning protrusions of the pipe clamp 300.

Figure 37:
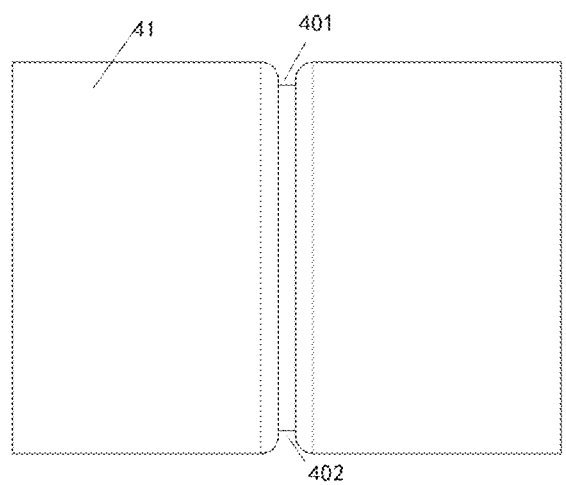
FIG. 37 is a structural diagram of a sealing member according to a second embodiment of a pipe clamp assembly provided by the invention.

Referring to FIGS. 36 and 37, the third coupling section 31 of the pipe clamp 300 is provided with a third positioning protrusion 301, the fourth coupling section 31 is provided with a second positioning protrusion 302, the structure of the cooperated sealing component 41 is shown in FIG. 22. The sealing member 21 is provided with a third positioning groove 401 matching the third positioning protrusion 301 and a fourth positioning groove 402 matching the fourth positioning protrusion 302. The third positioning groove 401 and the fourth positioning groove 402 are symmetrical. The shape, size, depth and setting position of the third positioning groove 401 are adapted to the third positioning protrusion 301, and the shape, size, depth and setting position of the fourth positioning groove 402 are adapted to the fourth positioning protrusion 302.

The embodiment provides a pipe clamp assembly, which has a longer length in the axial direction, and further improves the reliability and tightness of pipe fitting connection. Although preferred embodiments of the present invention have been described, those skilled in the art may make additional changes and modifications to these embodiments once they know the basic inventive concept. Therefore, the appended claims are intended to be interpreted as including preferred embodiments and all changes and modifications falling within the scope of the present invention. Obviously, those skilled in the art can make various changes and modifications to the invention without departing from the spirit and scope of the invention. Tus, if these modifications and variations of the invention fall within the scope of the claims of the invention and its equivalent technology, the invention is also intended to include these modifications and variations.

What is claimed is:

1. A pipe clamp assembly capable of realizing quick connection, comprising:
   a first coupling section and a second coupling section for fixing pipe fittings together end-to-end, the first coupling section having a first inner wall and the second coupling section having a second inner wall and an exterior surface;
   one end of the first coupling section and one end of the second coupling section are connected through a plurality of first connecting mechanisms, and the other end of the first coupling section and the other end of the second coupling section are connected through a plurality of second connecting mechanisms;
   the first inner wall of the first coupling section having at least one positioning protrusion integrally cast with the first coupling section at a geometric center of the first inner wall of the first coupling section, and the second inner wall of the second coupling section having at least one positioning protrusion integrally cast with the second coupling section at a geometric center of the second inner wall of the second coupling section, wherein the at least one positioning protrusion integrally cast with the first coupling section has an arc length less than an arc length of the first coupling section and the at least one positioning protrusion integrally cast with the second coupling section has an arc length less than an arc length of the second coupling section; and
   a sealing member;
   wherein the sealing member includes positioning grooves adapted to match the at least one positioning protrusion integrally cast with the first coupling section and the at least one positioning protrusion integrally cast with the second coupling section;
   wherein the at least one positioning protrusion integrally cast with the first coupling section, the at least one positioning protrusion integrally cast with the second coupling section, and the positioning grooves of the sealing member provide a setting for positioning the pipe fittings or pipes within the the first inner wall of the first coupling section and the second inner wall of the second coupling section; and
   wherein the plurality of first connecting mechanisms includes a plurality of first bolts, a plurality of first bolt holes arranged at one end of the first coupling section and a plurality of second bolt holes arranged at one end of the second coupling section, and wherein the plurality of second connecting mechanisms includes a plurality of first separated pins and a plurality of second separated pins extending respectively from the other end of the first coupling section, the plurality of the first separated pins and the plurality of the second separated pins each having an arc-shaped surface, and a plurality of separated column connectors extending from the other end of the second coupling section and a plurality of separated columns connected to the plurality of the separated column connectors, wherein the plurality of the separated column connectors each extend and insert between the plurality of the first separated pins and the plurality of the second separated pins respectively with the plurality of the separated columns positioned against the arc-shaped surface of the plurality of the first separated pins and the plurality of the second separated pins respectively, the arc-shaped surface of the plurality of the first separated pins and the plurality of the second separated pins matching the plurality of the separated columns to hold the other end of the first coupling section against the other end of the second coupling section.

2. The pipe clamp capable of realizing quick connection according to claim 1, wherein the at least one positioning protrusion integrally cast with the first coupling section is symmetrically distributed with the at least one positioning protrusion integrally cast with the second coupling section.

3. The pipe clamp capable of realizing quick connection according to claim 2, wherein the at least one protrusion integrally cast with the first coupling section is at least a first and second positioning protrusion, and the at least one protrusion integrally cast with the second coupling section is at least a first and second positioning protrusion.

4. The pipe clamp capable of realizing quick connection according to claim 1, wherein the at least one positioning protrusion integrally cast with the first coupling section and the at least one positioning protrusion integrally cast with the second coupling section have a height in the radial direction of 2 mm to 10 mm.

5. The pipe clamp capable of realizing quick connection according to claim 1, wherein the arc length of the at least one positioning protrusion integrally cast with the first coupling section is ⅓ to ⅔ of the arc length of the inner wall of the first coupling section; and
   wherein the arc length of the at least one positioning protrusion integrally cast with the second coupling section is ⅓ to ⅔ of the arc length of the inner wall of the second coupling section.

6. The pipe clamp capable of realizing quick connection according to claim 1, wherein two sides of an inner surface of the first coupling section are provided with a first arc segment in contact with the pipe fittings or pipes, and the first arc segment of the first coupling section is semi elliptical-shaped;
   a first radius from a center of the first arc segment of the first coupling section to an end of the first arc segment of the first coupling section is greater than a second radius from the center of the first arc segment of the first coupling section to a middle end of the first arc segment of the first coupling section.

7. The pipe clamp capable of realizing quick connection according to claim 1, wherein two sides of an inner surface of the second coupling section are provided with a second arc segment in contact with the pipe fittings or pipes, and the second arc segment of the second coupling section is semi elliptical-shaped.

\* \* \* \* \*